M. A. TERRY.
GAS VALVE.
APPLICATION FILED OCT. 29, 1915.
1,191,930.
Patented July 18, 1916.
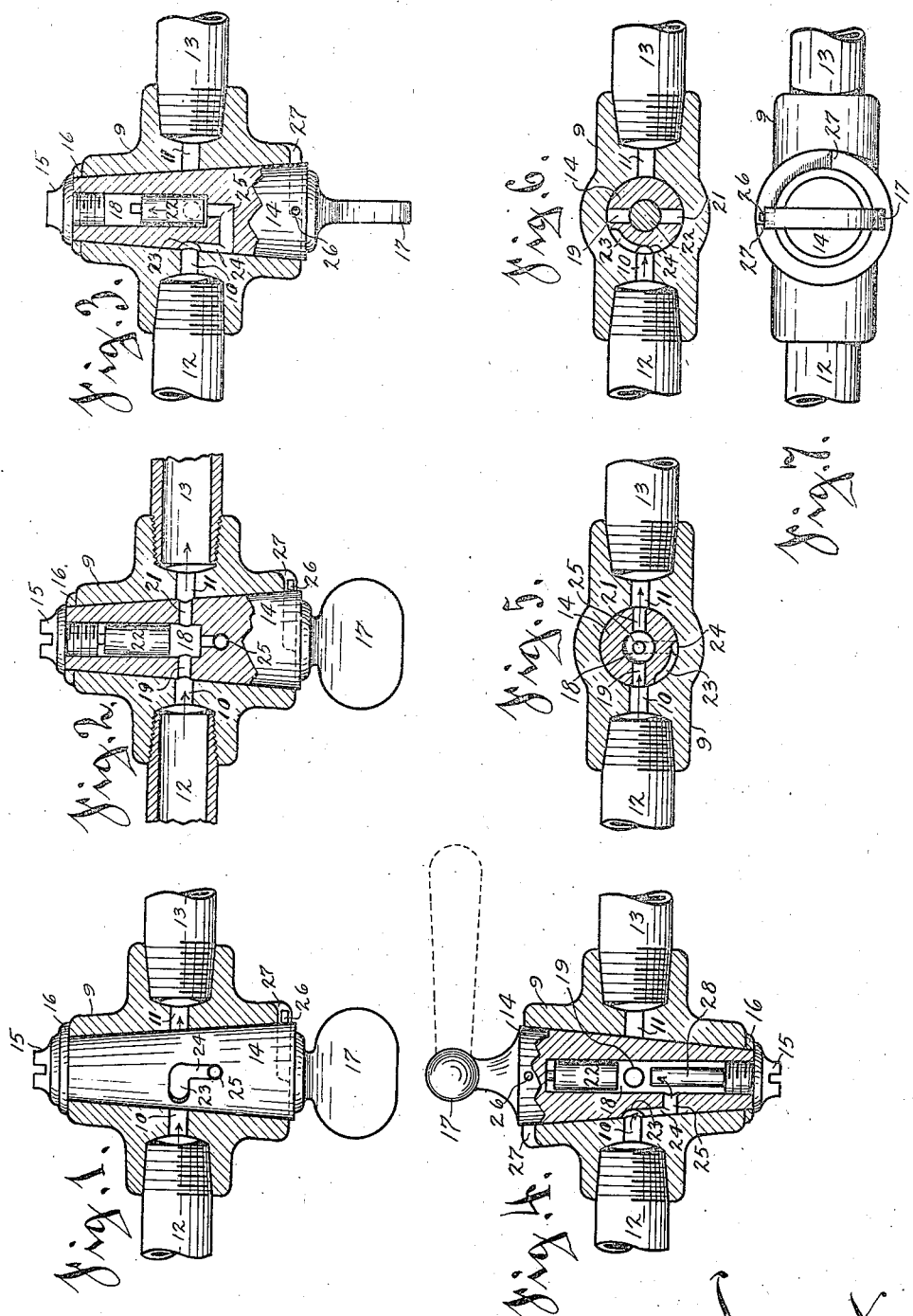
Inventor.
Miles A. Terry
by C. Spengelatt

UNITED STATES PATENT OFFICE.

MILES A. TERRY, OF MIDDLEPORT, OHIO, ASSIGNOR OF ONE-HALF TO MAYNARD L. DAVIS, OF MIDDLEPORT, OHIO.

GAS-VALVE.

1,191,930. Specification of Letters Patent. Patented July 18, 1916.

Application filed October 29, 1915. Serial No. 58,575.

*To all whom it may concern:*

Be it known that I, MILES A. TERRY, residing at Middleport, Meigs county, State of Ohio, have invented certain new and useful Improvements in Gas-Valves, of which the following is a clear, full, and exact description, attention being called to the drawing which accompanies this application and forms a part thereof.

This invention relates to improvements in valves for controlling the flow of gas through pipes to supply the same for use in burners or for any other purpose.

The object of the improvements is to provide means which prevent escape of gas through open out-lets, burners for instance, in case the supply fails without notice or occurs under circumstances where such failure escapes observation.

The invention consists of the construction hereinafter described and claimed, and illustrated in the accompanying drawing in which:

Figure 1 shows a side-view of the device with the valve housing in longitudinal section, the valve being open. Fig. 2 shows a longitudinal section of the entire device, the valve being open. Fig. 3 in a view substantially similar shows the valve closed. Fig. 4 in a view also similar, shows the device constructed in a modified manner. Fig. 5 shows a horizontal section of the device through the center of the valve housing and as the device appears in Fig. 2. Fig. 6 is a similar view of the device as it appears in Fig. 3. Fig. 7 is an underside view of the device as it appears in Fig. 3.

In the drawing, 9 indicates the valve-housing provided on opposite sides with ports 10 and 11 which are extended outwardly and formed into nipples to permit pipe connection. The gas is presumed to enter the valve housing through one of these pipes, pipe 12 and when the valve is open it passes to the other pipe 13. When the device is used in direct connection with a burner, one of these nipples may be arranged to permit direct connection of such burner, the same taking then the place of one of the pipes.

Passage from one pipe to the other is controlled by a valve 14 in shape of a plug which is tapering, to maintain a close-fitting seat in the valve-housing. It is held to its seat by a screw 15 with a washer 16 interposed between said screw and the valve-housing. At its larger end the valve is provided with manipulating means 17. These means are positioned either above the pipe as shown in Fig. 4 or below the same as shown in the other figures as may be required. The valve is provided with a cylindrical chamber 18 which is open at one end of the valve.

19 and 21 indicate two diametrically alined ports in the valve, and when these ports are alined with ports 10 and 11 in the housing 9, gas may flow through the valve from one pipe to the other as shown in Figs. 1, 2 and 5.

22 indicates a small plug in shape of a solid cylinder which occupies chamber 18 with a sliding fit so that, its length being less than the height of said chamber, it may freely move therein. Its length is further so limited that when it is in its elevated position, as shown in Fig. 2, its lower end is above the ports in the valve so that when it occupies this position, and under conditions as shown in Fig. 1, it is held up by the pressure of the gas which passes below it. If now for some reason the pressure of the gas fails, or the gas is cut off, plug 22 drops, as shown in Fig. 3, and closes passage through valve 14. If this deficiency has not been noticed and the gas is restored, no escape of gas can take place through any open outlets, burners for instance, because such is prevented by plug 22.

To obtain gas at the burners, the obstruction interposed by the plug must first be removed and this is done by manipulating the open valve the same as if it were to be closed in case when it is desired to shut off the gas, Figs. 3, 6 and 7 showing these positions. The object of this particular manipulation is to obtain the effect of gas-pressure for the purpose of raising the plug from its obstructing position to its former position. This is accomplished by the aforesaid manipulation which admits gas into chamber 18 and below the plug by means of a horizontal groove 23 in the outside of valve 14 and located in the surface between ports 19 and 21. This groove communicates by means of a vertical channel 24 with a duct 25 which duct leads into the interior of valve 14 and enters the same below plug 22 therein.

It will now be seen that when valve 14 is being turned from the position shown in Fig. 2 to the closing position shown in Fig. 3, groove 23 enters into communication with port 10 on the gas receiving side of the housing, as shown in Figs. 3, 4 and 6, which port is charged with gas. Therefore as soon as the valve has arrived in this position as shown in Fig. 3, gas immediately enters also below the plug and lifts the same as shown in Fig. 4. It also holds it in this elevated position and when thereafter the valve is opened again no change occurs in the position of the plug because then the direct pressure assumes this function as shown in Figs. 1, 2 and 5. Groove 23 terminates close to port 19 as shown in Figs. 5 and 6 so that on opening, this direct pressure from port 10 is admitted to port 21 before groove 23 passes entirely out of communication with port 10.

Valves of this kind are usually provided with stops which control the rotation of the valve within proper limits with reference to its open and closed positions. In the drawing a pin 26 is shown on the valve, adapted to co-act with stops 27 formed on the valve-housing and so arranged as to prevent rotation from the position shown in Figs. 1, 2 and 5 beyond the position shown in Figs. 3, 4, 6 and 7, in which the valve is closed. The available range of rotation is a quarter turn to obtain proper control of the gas admittance to the interior of the valve and proper automatic actuation of plug 22 by the gas. Stops 27 are located accordingly.

When the valve is open the flow of gas is the same as in any other valve and proceeds directly through the four ports which are all alined and form a straight passage as shown in Figs. 2 and 5. All the other passages are blind at that time, that is to say, no gas passes through them, nor are there any ports whatsoever in plug 22 so that the possibility of corrosion is greatly limited. Contact at the upper end of the plug is also limited in the manner shown to prevent sticking.

My improvement may be applied irrespective of the position of the manipulating means. Where the handle is used at the upper end of the valve, as shown in Fig. 4, means are provided to limit the drop plug 22, to a position above duct 25 which may be accomplished by means of a suitable stop or internal seat. A preferable way is by provision of a stem 28 on screw 15.

Having described my invention, I claim as new:

1. In a valve of the kind described, the combination of a housing having an inlet port and an outlet port alined therewith, a valve provided with a chamber and with alined inlet and outlet ports for this chamber and fitted for rotation to said housing, a plug movably fitted to said chamber and adapted to be actuated by the gas pressure to control passage between the ports in the valve, a duct in the valve open to the lower part of the chamber therein, a groove in the outside of the valve between the ports thereof which communicates with said duct, manipulating means permitting rotation of the valve to aline its inlet port or the groove in its outside with the inlet port in the valve-housing, and means to limit the rotation of the valve so that when in closed position, the groove in the valve is in open communication with this inlet port in the valve-housing, to admit gas to the chamber in the valve for the purpose of acting against the underside of the plug therein.

2. In a valve of the kind described, the combination of a housing having an inlet port and an outlet port alined therewith, a valve having a cylindrical chamber with alined inlet and outlet ports therefor and fitted for rotation to said housing and in a manner that when the valve is open, the inlet ports are alined on one side and aline with the alined outlet ports on the other side and form a direct and straight passage for the gas, a plug movably fitted to the chamber in the valve so as to have a vertical movement therein subject to control by the pressure of the gas and whereby this plug is held above the ports in the valve while the gas passes below its lower end through the alined ports and from which position it is adapted to drop to close the ports in the valve when not sustained by the gas pressure, a duct leading to the chamber in the valve and opening into the same at a point below the lowermost position of the plug, a groove in the outside of the valve between the ports in the same and a channel whereby this groove communicates with the duct, said groove being so positioned that closing of the valve places it in open communication with the inlet port in the valve-housing so as to permit gas to pass through it and through the channel and duct mentioned, into the chamber in the valve below the plug therein, for the purpose of raising the same.

In testimony whereof I hereunto affix my signature this 23d day of October, 1915, at Middleport, Meigs county, Ohio.

MILES A. TERRY.

Witnesses:
WILLIAM A. GILES,
WILLIAM C. CHILDERS.